United States Patent Office 3,527,594
Patented Sept. 8, 1970

3,527,594
PROCESS FOR OBTAINING FAVOURABLE PHYSIOLOGICAL EFFECTS ON CULTIVATED PLANTS
Joseph René Brepoels, Beverloo, and Armand August Busschots, Sint-Truiden, Belgium, assignors to Poudreries Reunies de Belgique, Brussels, Belgium
No Drawing. Filed Jan. 14, 1969, Ser. No. 791,128
Claims priority, application Belgium, Jan. 17, 1968, 709,496
Int. Cl. A01n 9/06, 9/20
U.S. Cl. 71—105      6 Claims

ABSTRACT OF THE DISCLOSURE

Process for obtaining favourable physiological effects on cultivated plants, these effects being particularly the obtaining of better crops as regards quality and quantity, this process consisting in that plants which have reached a certain degree of growth are treated with N'-cyanoalkylated chlorobenzylidene hydrazines having the following representative formula:

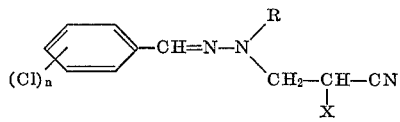

in which

R can be a hydrogen atom or a cyanoalkyl group;
X represents a hydrogen atom, a halogen or an alkyl group;
$n$ is an integer and can assume the value 1, 2, 3, 4 or 5.

---

The present invention relates to a process for obtaining favourable physiological effects on cultivated plants, these effects being particularly the obtaining of better crops as regards quality and quantity of the products being won.

United Kingdom patent specification No. 1,019,120 discloses, inter alia, herbical compositions which contain as active ingredients a compound having the formula

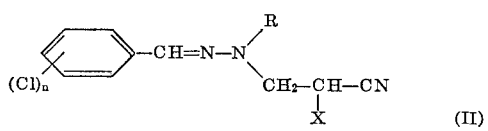

wherein

X represents a halogen atom or a hydroxy, alkoxy, or acyloxy group;
$m$ is an integer from 1 to 5;
$R_1$ represents a hydrogen atom or a substituted or unsubstituted hydrocarbyl group; and
$R_2$ represents a substituted or unsubstituted hydrocarbyl group, with the proviso that $R_1$ and $R_2$ may form together with the nitrogen atom to which they are bound a saturated or unsaturated heterocyclic ring.

We have now found surprisingly that the application to cultivated plants of compositions containing certain N'-cyanoalkylated chlorobenzylidene hydrazines produces unexpectedly beneficial physiological effects on the cultivated plants, in many cases producing an improvement in the quality and quantity of the crop, which is independent of any herbicidal action on adventitious plants or weeds. These N'-cyanoalkylated chlorobenzylidene hydrazines have the formula

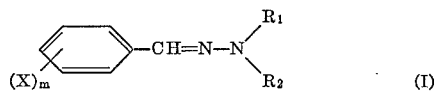

in which

R can be a hydrogen atom or a cyanoalkyl group;
X represents a hydrogen atom, a halogen atom or an alkyl group; and
$n$ is an integer and can assume the values 1, 2, 3, 4 or 5.

The process according to the invention consists essentially in that at a certain degree of growth the said cultivated plants i.e. their flowers, stalks, leaves are treated with the compounds having the above mentioned formula and composition.

As examples of compounds according to the present invention, the following may be mentioned:

N-(2,6-dichlorobenzylidene)-N'-(2-cyanoethyl)hydrazine,
N-(2,6-dichlorobenzylidene)-N,N'-bis(2-cyanoethyl)-hydrazine,
N-(2,4-dichlorobenzylidene)-N'-(2-cyanoethyl)hydrazine,
N-(2,4-dichlorobenzylidene)-N,N'-bis(2-cyanoethyl)-hydrazine,
N-(3,4-dichlorobenzylidene)-N'-(2-cyanoethyl)hydrazine,
N-(3,4-dichlorobenzylidene)-N,N'-bis(2-cyanoethyl) hydrazine,
N-(2,6-dichlorobenzylidene)-N'-(2-cyano-2-methylethyl) hydrazine,
N-(2,4-dichlorobenzylidene)-N'-(2-cyano-2-methylethyl) hydrazine,
N-(3,4-dichlorobenzylidene)-N'-(2-cyano-2-methylethyl) hydrazine,
N-(2-chlorobenzylidene)-N'-(2-cyanoethyl)hydrazine.

The numerous applicants' experiments in greenhouse or in open air which will be exposed hereinafter on dicotylea and monocotylea show clearly for the products to be considered in the present invention any absence of a degrading action on the plants having been treated and a fortiori any "herbicidal" action is immaterial.

The preparation of the said N'-cyanoalkylated chlorobenzylidene hydrazines can be effected by condensation of the corresponding chlorobenzaldehydes with a N-cyanoalkylated derivative of hydrazine; this condensation is carried out in alcoholic medium:

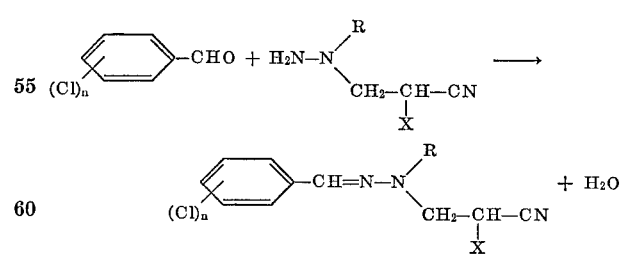

The symbols R, X and $n$ have the same meaning as that given above in the text.

The N-cyanoalkylated derivative of hydrazine can be obtained, for example, by causing the reaction with hydrazine of the corresponding cyano-olefin:

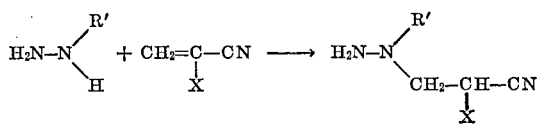

R' representing here a hydrogen; X having the same meaning as that given above.

A, N,N-dicyanoalkylated hydrazine can be obtained by cyanoalkylation of N-monocyanoalkylated hydrazine:

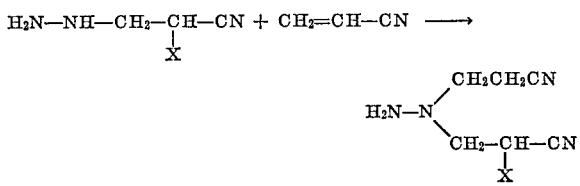

EXAMPLES OF PREPARATION

EXAMPLE I

Preparation of the N'-(2-cyanoethyl)-N-(2,6-dichlorobenzylidene) hydrazine. A mixture of 175 gg. of 2,6-dichlorobenzaldehyde, 90 g. of N-(2-cyanoethyl)hydrazine and 750 ml. of pure ethanol is heated under reflux for 2 hours. The mixture is cooled to 25° C. and diluted with 100 ml. of water. By cooling to 0° C., the N-(2-cyanoethyl)-N-(2,6-dichlorobenzylidene)hydrazine precipitates in the form of white crystals. 221 g. of the desired product are obtained.

Melting point: 75–76° C.

Percent chlorine calculated: 29.33. Percent chlorine found: 29.2; 29.3.

EXAMPLE II

A mixture of one mole of 2,6-dichlorobenzaldehyde, 1.15 moles of N-(2-cyano-2-methylethyl)hydrazine in aqueous solution and 750 ml. of pure ethanol is heated under reflux for 4 hours.

It is cooled to 0° C.; the N-(2,6-dichlorobenzylidene) N'-(2-cyano-2-methylethyl)hydrazine precipitates in the form of white crystals.

Melting point: 45–46° C.

Percent calculated: 27.73. Percent chlorine found: 27.1.

175 g. are obtained.

The other derivatives which are foreseen from the general formula as given above can be prepared in similar manner.

The composition according to the present invention can be applied:

(1) In the form of wettable powders containing the active ingredient, a solid carrier or carriers and a surface-active agent or agents.

As solid carrier, it is possible to use natural mineral powders (for example, kaolins, aluminas, talcum, chalk) and synthetic mineral powders (for example, dispersed silicic acid, silicates).

As surface-active agents, it is possible to use ionic or non-ionic emulsifiers (for example, alkyl sulphonates and aryl sulphonates, polyoxyethylene ester of fatty acid) and dispersion agents, such as lignin, residual sulphite lyes and carboxymethyl cellulose.

Example: | Percent
--- | ---
Active substance | 50
Kaolin | 25
Synthetic silica | 22
Carboxymethyl cellulose | 1.5
Non-ionic surface-active agent | 1.5

(2) In the form of dusting powders, containing the active substance and a finely divided solid carrier.

(3) In the form of solutions in an organic solvent.

(4) In the form of emulsifiable concentrates, which are concentrated solutions of the active product in an organic liquid, preferably insoluble in water, containing one or more surface-active agents.

As solvents, it is posible to employ aromatic hydrocarbons (for example, xylene, benzene, chlorobenzene); paraffins (for example, petroleum fractions); alcohols, and ketones (for example methanol, butanol, etc.); amines (for example, ethanolamine, dimethylformamide) and water. As surface-active agents, it is possible to use those indicated above under (1).

Example: | Percent
--- | ---
Active substance | 25
Cyclohexanone | 20
Xylene | 50
Mixture of surface-active agents | 5

The N'-cyanoalkylated chlorobenzylidene hydrazines according to the present invention have a very beneficial direct physiological action on certain cultivated plants.

This action is different from that of products such as (2-chlorethyl)-trimethyl ammonium chloride, N-dimethylaminosuccinamic acid or 2-(2-chloro-2-cyanoethyl)-6-chlorotoluene, which are known in this field of agricultural applications. This difference in action (with respect to known products) is shown during the growth of the treated plants; it is unquestionable at the time when the cultivated plants in question have reached maturity.

In actual fact, the N'-cyanoalkylated chlorobenzylidene hydrazines forming the subject of the present invention, when applied to certain cultivated plants such as potatoes, wheat, barley, apple trees, celery, etc., have the specific effect that better crops are obtained as regards quality and quantity.

Among the experiments executed in the open air it is necessary to refer to those effected in orchards which have been treated by the products used according to the invention—the orchards being situated in various spots—and in which it was possible to ascertain (at a period situated between the date of treatment by the products and the date at which the fruits have been won) either the absence or the presence of weeds at the foot of the fruit trees and this according whether the nursery gardener had effectively made use of herbicides.

The following Table I shows the action on tomatoes and barley of various products according to the present invention.

The said plants are treated in a greenhouse, once by spraying on to the foliage. The concentration of the active substance in emulsion is 0.05% by weight.

The measurements, related to those of a comparison plant (untreated plant) show the evident physiological action of the applied products. The average of three repetitions is given for the tomatoes and of five repetitions for the barley.

These measurements were made one and a half months after the treatment.

TABLE I

| Products | "Solanum lycopersicum L." tomatoes | | | "Hordeum savitum" barley |
|---|---|---|---|---|
| | Height in cm. | Diameter in the stem (in cm.) | No. of leaves per plant | |
| Control | 107 | 0.63 | 32 | 182 |
| 2,6-Cl$_2$-C$_6$H$_3$-CH=N-NH-CH$_2$CH$_2$CN | 71 | 0.7 | 26 | 155 |
| 2,6-Cl$_2$-C$_6$H$_3$-CH=N-N(CH$_2$CH$_2$CN)$_2$ | 83 | 0.8 | 32 | 126 |
| 2,4-Cl$_2$-C$_6$H$_3$-CH=N-N(CH$_2$CH$_2$CN)$_2$ | 78 | 0.55 | 17 | 181 |
| 2,6-Cl$_2$-C$_6$H$_3$-CH=N-NH-CH$_2$-CH(CH$_3$)-CN | 72 | 0.65 | 16 | 138 |
| 2,4-Cl$_2$-C$_6$H$_3$-CH=NH-CH$_2$-CH(CH$_3$)-CN | 70 | 0.56 | 27 | 193 |
| 2,4-Cl$_2$-C$_6$H$_3$-CH=N-NH-CH$_2$-CH(CH$_3$)-CN | 76 | 0.66 | 27 | 180 |

Table II, which complements the foregoing table, relates to the measurements made in a greenhouse on tomatoes and barley, after comparative treatments on plants with N-(2,6-dichlorobenzylidene) - N' - (2-cyanoethyl)hydrazine, on the one hand, and with 2-(2-chloro-2-cyanoethyl) - 6 - chlorotoluene (known) on the other hand.

As can be seen from this table, the growth-inhibiting action on tomatoes of the N - (2,6-dichlorobenzylidene)-N'-(2-cyanoethyl)hydrazine does not affect the number of leaves per plant.

By concentration of active substance (A.S.) it is necessary to understand the percentage (by weight) of this substance in the emulsion sprayed on to the foliage.

The measurements were taken once every 40 days after the treatment.

TABLE II

| Product | Concentration of active substance | Average height in cm. | Number of internodes | Plant |
|---|---|---|---|---|
| Comparison | | 40.3 | 12.0 | Tomatoes. |
| A | 0.025 | 18.0 | 9.6 | |
| B | 0.025 | 14.6 | 12.5 | |
| Comparison | | 18.2 | | Barley. |
| A | 0.05 | 12.7 | | |
| B | 0.05 | 15.5 | | |

N.B.: A: 2-(2-chloro-2-cyanoethyl)-6-chloro-toluene. B: N-(2,6-dichlorobenzylidene)-N'-(2-cyanoethyl)-hydrazine.

In Table III, there are compared the results obtained on apple trees after treatment with N-(2,6-dichlorobenzylidene)-N'-(2-cyanoethyl)hydrazine, on the one hand, and known products, on the other hand.

The application of these products was effected at the commencement of flowering by spraying emulsion on to the foliage. The checks were made one month later.

The concentration of active substance in emulsion is in each case 0.05% by weight.

TABLE III

| Products | Concentration in A.S., percent | Average growth of shoots in cm. | Number of leaves per tree |
|---|---|---|---|
| Comparison | | 38.3 | 40.3 |
| A | 0.05 | 38.0 | 30.6 |
| B | 0.05 | 37.0 | 33.6 |
| C | 0.05 | 18.0 | 32.6 |

N.B.: A: (2-chlorethyl)trimethyl ammonium chloride. B: 2-(2-chloro-2-cyanoethyl)-6-chlorotoluene. C: N-(2,6-dichlorobenzylidene)-N'-(2-cyanoethyl)-hydrazine.

The results of Table III show the particular action of N-(2,6 - dichlorobenzylidene) - N' - (2--cyanoethyl)hydrazine, compared with the results of the other products. It is to be noted that this action has an evident effect on the average growth of the tree, and the reduction in the number of leaves per tree is proportionally small.

The Tables IV(a), (b), (c) and (d) are concerned with the application of N-(2,6-dichlorobenzylidene)-N'-

(2-cyanoethyl)hydrazine on cultivations of various varieties of potatoes.

A comparison is made in each case, for a single variety, with plants treated with a known product.

The application was made by spraying an emulsion of active substance on to the foliage.

The results obtained show that the action of N-(2,6-dichlorobenzylidene)-N'-(2-cyanoethyl)hydrazine is repaid by obtaining more abundant crops.

TABLE V

| Product | Dose in A.S. (g.) | Yield in g./100 ears | |
|---|---|---|---|
| | | Treatment at commencement of flowering | Treatment with full flowering |
| Comparison | | 180 | 160 (180) |
| A | 500 | 175 | 171 (192) |
| B | 500 | 184 | 189 (213) |

N.B.: A: 2-(2-chloro-2-cyanoethyl)-6-chlorotoluene. B: N-(2,6-dichlorobenzylidene)-N'-(2-cyanoethyl)-hydrazine.

TABLE IV (a) Variety: "Bintje"

| Products | Dose of A.S./ hectare (kg.) | Yield in kilos per 20 plants | | | | | Yield in kilos per hectare (30,000 pl./ hectare) |
|---|---|---|---|---|---|---|---|
| | | I | II | III | IV | Average | |
| Comparison | | 38.0 | 33.5 | 42.0 | 40.0 | 38.3 | 57,300 |
| A | 0.5 | 35.0 | 36.0 | 40.0 | 44.0 | 38.7 | 57,900 |
| B | 0.5 | 45.5 | 38.0 | 42.5 | 46.5 | 43.1 | 64,500 |

(b) Variety: "Climax"

| Comparison | | 32.4 | 37.5 | 49.5 | 41.5 | 38.0 | 57,000 |
|---|---|---|---|---|---|---|---|
| A | 1 | 44.0 | 46.5 | 37.0 | 37.0 | 41.1 | 61,500 |
| B | 1 | 49.0 | 45.0 | 40.5 | 45.5 | 45.0 | 67,500 |

N.B.: A:2-(2-chloro-2-cyanoethyl)-6-chlorotoluene. B:N-(2,6-dichlorobenzylidene)-N'-(2-cyanoethyl) hydrazine.

(c) Variety: "Bintje"

| Products | Dose of A.S./ hectare (kg.) | Yield in kilos per 20 plants | | | | | Yield in kilos per hectare (30,000 pl./ hectare |
|---|---|---|---|---|---|---|---|
| | | I | II | III | IV | Average | |
| Comparison | | 28.5 | 39.0 | 35.5 | 41.5 | 36.1 | 54,000 |
| A | 1 | 32.0 | 38.0 | 33.0 | 42.0 | 36.2 | 54,300 |
| B | 1 | 41.5 | 34.0 | 36.5 | 40.0 | 38.0 | 57,000 |

(d) Variety: "Bintje"

| Products | Dose of A.S./ hectare (kg.) | Yield in kilos per 10 plants | | | | | Yield in kilos per hectare (40,000 pl/ hectare) |
|---|---|---|---|---|---|---|---|
| | | I | II | III | IV | Average | |
| Comparison | | 11.5 | 9.5 | 10.0 | 12.5 | 10.875 | 43,500 |
| A | 1 | 12.0 | 9.5 | 11.0 | 9.0 | 10.375 | 41,500 |
| B | 5 | 11.5 | 9.0 | 9.5 | 9.0 | 9.75 | 39,000 |
| B | 2.5 | 10.5 | 10.0 | 13.5 | 11.0 | 11.25 | 45,000 |
| B | 1.25 | 12.5 | 11.5 | 11.5 | 12.5 | 12.0 | 48,000 |

N.B.: A: 2-(2-chloro-2-cyanoethyl)-6-chlorotoluene. B: N-(2,6-dichlorobenzylidene)-N'-(2-cyanoethyl)hydrazine.

N.B.: A: 2-(2-chloro-2-cyanoethyl)-6-chlorotoluene. B: N-(2,6-dichlorobenzylidene)-N'-(2-cyanoethyl)hydrazine.

These four sections of Table IV show the beneficial influence of the N-(2,6-dichlorobenzylidene)-N'-(2-cyanoethyl)hydrazine on the production of potatoes.

The analysis of the variants (see IV(d)) shows that, for this same product, the differences are significant between 5 and 1.25 kg. of active substance per hectare.

Table V illustrates the positive effect obtained on wheat following a treatment with a solution containing N-(2,6-dichlorobenzylidene)-N'-(2-cyanoethyl)hydrazine.

At harvest time, an increase in the wheat yield (g./100 ears) is observed. This increase is greater when the active substance has been applied at the time of full flowering.

A comparison was made with 2-(2-chloro-2-cyanoethyl)-6-chlorotoluene, known as a growth regulator.

The wheat was treated in June by the active substances in emulsion being sprayed on to the plants.

The values put between brackets in the fourth column have only for their object to give a rapid comparison with the data of the third column; to this end the two comparisons (at the top of the column) have been brought to the same value of 180/100 ears; in consequence the data A and B of this fourth column have also been modified and have been multiplied by 180/160; the numbers put between brackets are thus not absolutely necessary.

Tables VI(a) and (b), which relate to the results obtained on apple trees by application of an emulsion of N-(2,6-dichlorobenzylidene)-N'-(2-cyanoethyl)hydrazine, show that the physiological action of this derivative has the effect of improving the quality of the crop.

By comparing these results with those concurrently obtained by application of N-dimethylamino-succinamic acid, the superiority of the N-(2,6-dichlorobenzylidene)-N'-(2-cyanoethyl)hydrazine is very obvious.

The concentration of active substance is expressed as a percentage by weight in the emulsion sprayed on to the foliage.

TABLE VI (a) Variety: "Golden Delicious" on type IX. Age: 7 years.

| Product | Concentration of A.S., percent | Dates and numbers of treatments | No. of fruits Per tree | Wt. of fruit (kg.) Per tree | Average weight per fruit (g.) | Percent of fruit gauging 70 mm. |
|---|---|---|---|---|---|---|
| Comparison | | | 337 | 50.2 | 148 | 91 |
| A | 0.1 | 9 June, 1 | 299 | 36.5 | 122 | 86.6 |
| B | 0.1 | | 196 | 35 | 178 | 92.8 |
| A | 0.1 | 9 June, 2 | 415 | 59 | 142 | 89.6 |
| B | 0.1 | 23 June | 343 | 55.5 | 161 | 94.1 |
| A | 0.1 | 24 May, 3 <br> 9 June | 262 | 39 | 148 | 79.7 |
| B | 0.1 | 23 June | 255 | 46.5 | 182 | 95.2 |

N.B.: A: N-dimethylamino-succinamic acid. B: N-(2,6-dichlorobenzylidene)-N'-(2-cyanoethyl)hydrazine.

(b) Variety: "Golden Delicious" on type IX. Age: 5 years.

| Products | Concentration of A.S., percent | Date of treatment | No. of fruits per tree | Weight of fruit per tree (kg.) | Average weight per fruit (g.) |
|---|---|---|---|---|---|
| Comparison | | | 245 | 38.0 | 155 |
| A | 0.2 | 27 July | 265 | 41.5 | 156 |
| B | 0.2 | | 218 | 40.0 | 183 |

N.B.: A: N-dimethylamino-succinamic acid. B: N-(2,6-dichlorobenzylidene)-(2-cyanoethyl)hydrazine.

In a last table (VII), it is possible to see that the action on celeriac of N-(2,6-dichlorobenzylidene)-N'-(2-cyanoethyl) hydrazine has the effect of increasing the weight of the tubers.

The application of this derivative was effected by spraying an aqueous emulsion on to the plants. The concentrations of active substance are expressed as a percentage by weight in the said emulsion.

TABLE VII.—CELERIAC

Average weight per tuber
(average for 15 plants)
Concentrations of A.S.: G.
 Comparison _____ 450
 0.1% _____ 560
 0.2% _____ 550

The examination of those tables may give birth to the question why the favourable physiological action that is proposed by the invention may produce effects which apparently may be unfavourable (example diminution of the median height of the main stalk of the plant having been treated).

As already indicated, the action of the products being used according to the invention appears during the growth of the plants being treated and a well-known phenomenon in the vegetable kingdom physiology is that the products which are capable to act favourably on the production and the formation of fruits, vegetables, etc. possess simultaneously a "remming" action on the growth of the aerial organs (stalk, leave, etc.) of the plants being treated.

It is easy to understand the reason of the presence of Tables I–II (apparently negative) is only to put into evidence the peculiar and characteristic action of those products on plants that are put biologically as a reference or comparison.

The Tables IV–V and following show the tangible and pertinent results of this characteristic action.

The treatment according to the invention may take place preferably between the beginning of the blossoming and 15 days after its end.

What we claim is:

1. A process for improving the yield and quality of crops from cultivated plants, comprising, treating said plants between the beginning of blossoming and about 15 days after the end of blossoming with N-(2,6-dichlorobenzylidene)-N'-(2-cyanoethyl)hydrazine in an amount sufficient to improve said yield and quality of said crops.

2. Process according to claim 1 wherein the hydrazine compound is applied to potato plants during blossoming of the latter in an amount between about 0.5 and 2.5 kgr. active ingredient per ha.

3. Process according to claim 1 wherein the hydrazine compound is applied to cereal plants during fall blossoming of the latter in an amount of about 500 gr. active ingredients per ha.

4. A process according to claim 1 wherein the hydrazine compound is applied to fruit plants during a period starting with the beginning of blossoming and ending about 15 days after the said blossoming in an amount between about 0.1 and 0.2% by weight of active ingredient suspended in water and at a rate of about 1000 l. of aqueous suspension per ha.

5. A process according to claim 1 wherein the hydrazine compound is applied to the cultivated plants in the form of an aqueous suspension obtained from a wettable powder.

6. A process according to claim 1 wherein the hydrazine compound is applied to cultivated plants in the form of an aqueous emulsion obtained from an emulsifiable concentrate.

References Cited

UNITED STATES PATENTS

| 2,792,296 | 5/1957 | Heininger | 71—105 |
| 2,802,021 | 8/1957 | Heininger | 71—105 |
| 3,033,893 | 5/1962 | Morin et al. | 71—105 |
| 3,138,630 | 6/1964 | Scotti et al. | 71—105 |
| 3,156,554 | 11/1964 | Tolbert | 71—76 |
| 3,305,347 | 2/1967 | Minieri | 71—121 |
| 3,376,125 | 4/1968 | McConnell et al. | 71—76 |
| 3,376,126 | 4/1968 | McConnell et al. | 71—76 |

FOREIGN PATENTS

| 780,316 | 3/1968 | Canada. |
| 1,455,835 | 3/1965 | France. |

OTHER REFERENCES

Poundreries Reunies de Belgique, "Crop Growth Promoter," Belgian patents report 29/68, July 1968.

Chao et al.: "Derivatives of 2,4-D Hydrazides, Etc." (1949), CA 43, p. 7554.

Dorn et al.: "Cyanoethylation and Sulfopropylation, Etc." (1967), CA 67, p. 21534a.

LEWIS GOTTS, Primary Examiner

G. HOLLRAH, Assistant Examiner

U.S. Cl. X.R.

71—76; 260—465, 465.5